July 29, 1969     E. D. MARADYN     3,458,215
LOAD BINDING ARRANGEMENT

Filed Dec. 27, 1967     2 Sheets-Sheet 1

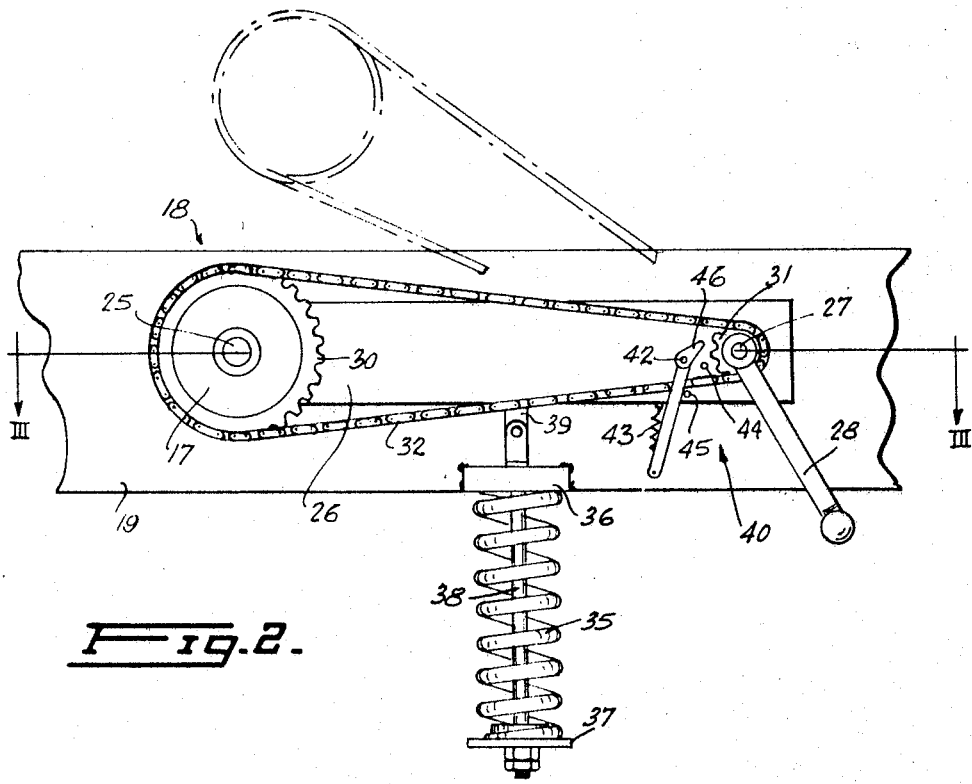

United States Patent Office 3,458,215
Patented July 29, 1969

3,458,215
LOAD BINDING ARRANGEMENT
Edward D. Maradyn, Fort William, Ontario, Canada, assignor to The Northern Engineering & Supply Co. Limited, Fort William, Ontario, Canada
Filed Dec. 27, 1967, Ser. No. 693,851
Int. Cl. B60p 7/00
U.S. Cl. 280—179                              6 Claims

ABSTRACT OF THE DISCLOSURE

A cable is disposed to envelope a load placed on the loading platform of a vehicle, one end of the cable being inserted into a fixing device at the rear end of the platform and the other end being wound onto a reel provided at the front end of the platform. The reel is mounted on one end of an arm, the other end of which is pivoted to the front end of the vehicle. A spring urges the arm in a direction to tension the cable around the load. A stop lever prevents unintended rotation of the reel.

This invention relates to arrangements for fastening loads, more particularly loads consisting of elongated articles such as logs or beams, as used for construction purposes, on the loading platform of a road, rail or other vehicle.

In the conventional manner of transporting such articles, platforms of trucks or trailers are used that are provided with walls or posts at their front and rear ends, but are normally open-sided to allow easy loading and unloading. The articles are placed on such platforms with their longitudinal axes transverse to the direction of travel of the vehicle. During travel, and particularly if this takes place over rough highways or those having numerous curves, there is a great danger that part of the load will be displaced along the longitudinal axis of the articles and eventually fall off, thereby possibly causing an accident.

In an endeavour to prevent such accidents, a rope chain or steel cable is often placed over the load and secured at the front and rear end of the platform. Experience has shown, however, that such a cable, even when originally fastened very tightly, quickly loosens due to vibrations set up during travel and the tendency for the load to settle, whereupon the cable becomes ineffectual.

The main object of the present invention is to overcome the above mentioned difficulties by providing means to facilitate safe transportation of lumber, beams or similar articles on the loading platform of a vehicle.

A further important object of the present invention is to provide an inexpensive load binding arrangement that can easily be installed on existing vehicle platforms.

To meet these objects the arrangement according to this invention comprises:

(a) Cable means disposed to envelope the load, with means for connecting one end of the cable means to a first part of the platform (usually one side, end or other extremity);

(b) A winch mounted on a second part of the platform (e.g. the other side or end) for winding in the other end of the cable means; and (c) Flexible means for tensioning the cable means around said load.

By operating the winch the flexible means will be tensioned to such an extent that the cable means remains tight even after the load has settled and its outer volume has shrunk due to vibrations experienced during travel.

In a preferred embodiment of this invention, the winch includes an arm and a take-up reel rotatably mounted on a first part of the arm, and means for pivotally mounting a second part of the arm on the said second part of the platform. The flexible means are disposed between the arm and the platform for urging the first part of the arm in a direction to tension the cable means around the load. In this embodiment all elements of the arrangement can be assembled to form a unit which may be mounted on the front or rear end of the platform. In the case in which the platform forms part of a trailer or truck, it is particularly advantageous to install the load binding arrangement at the front end of such platform. It is then only necessary for the truck driver to look through the rear window of his cab to observe the condition of the arm, in order to satisfy himself that there is still tension in the cable means.

Further features of the present invention will appear from the following specific description which is provided by way of example only. In the accompanying drawings:

FIGURE 2 is a front view of the arrangement shown in FIGURE 1;

FIGURE 3 is a section taken on the line 3—3 in FIGURE 2; and

FIGURE 4 is a side view of a loading platform equipped with a load binding arrangement according to a second embodiment of the present invention.

Figure 1:
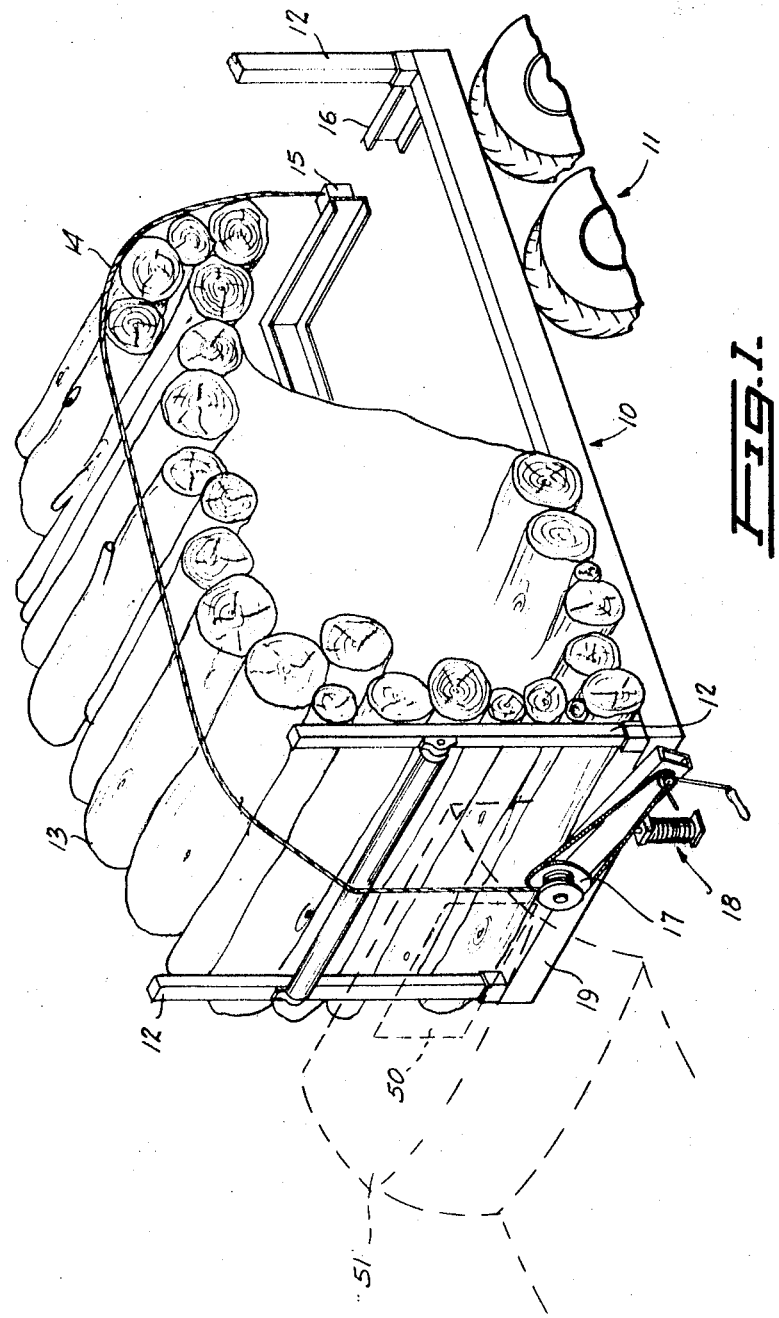
FIGURE 1 is a perspective view of a loading platform equipped with an arrangement according to a first embodiment of the present invention.

As shown in FIGURE 1, a loading platform 10 forming part of a truck body 11 is provided with an upright post 12 at each corner of the platform 10. The load 13 consists of logs that are loaded on the platform 10 with their longitudinal axis extending transverse to the direction of travel of the truck. One end of a steel cable 14 is connected to a fixing device 15 attached to the rear end 16 of the platform 10, while the other end of the cable 14 is wound on a reel 17 of a winch 18 which is mounted on the front end 19 of the platform 10.

FIGURES 2 and 3 show the winch 18 in more detail. The reel 17 is rotatably mounted on the shaft 25 secured to one end of an arm 26 of rectangular cross section. The other end of the arm 26 is pivotably mounted on a shaft 27 which is fixed to the front end 19 of the platform 10.

Rotatably mounted on the same shaft 27 but independently of the pivoting of the arm 26, is a manually-operable crank 28. Rigidly connected to the reel 17 is a first sprocket 30 and similarly, rigidly connected to the crank 28 is a second sprocket 31 having a substantially smaller number of teeth than the first sprocket 30. A chain 32 encircles both sprockets 30 and 31.

A compression spring 35 is disposed between an upper plate 36 attached to a lower portion of the front end 19 of the platform 10 and a lower plate 37. A rod 38 extends through the upper plate 36, the lower ends of both this rod 38 and the helical spring 35 being fixed to the lower plate 37. At its upper end the rod 38 is pivotally connected to an extension 39 provided at the lower side of the arm 26 at a location displaced horizontally from the shaft 27. As a result, the spring 35 tends to rotate the arm 26 counterclockwise thereby pulling the reel 17 downwardly and tensioning the cable 14 around the load 13.

To prevent unintended rotation of the reel 17 and unwinding of the cable 14 due to the action of the spring 35, a stop mechanism 40 is associated with the sprocket 31. The stop mechanism 40 comprises a manually operable lever 41 pivoted about a pin 42 and urged by a tension spring 43 into either of two stable positions defined by stops 44 and 45. In the position defined by the stop 44, the tip 46 of the lever 41 engages between the teeth of the sprocket 31 to prevent counterclockwise rotation thereof. By shifting the lever 41 into the position defined by the stop 45, the tip 46 is disengaged from the sprocket 31.

In operation, after the load 13 has been placed on the platform 10, the cable 14, one end of which may be permanently connected to the reel 17, or may be kept free, is placed over the load 13, and its other end is inserted into the fixing device 15 so as to envelope the load 13 as tightly as can conveniently be achieved manually without special effort. By then rotating the crank 28 in a clockwise direction, the cable 14 is wound onto the reel 17. As tension in the cable increases the arm 26 is pivoted about the shaft 27 in a clockwise direction to tension the spring 35 and thereby further tightening the cable 14 around the load 13. The maximum obtainable tension is limited by the complete compression of the spring 35. The lever 41 is then shifted into its position defined by the stop 44 to engage the tip 46 with the sprocket 31.

Due to vibrations experienced during travel, the cable 14 will tend to loosen, and, as a result, the arm 26 will swing about the shaft 27 in a counterclockwise direction following the urging of the spring 35. By looking through the rear window 50 of the driver's cab 51 and thus without any need to alight, the driver can occasionally check on the position of the arm 26, and, if necessary, again operate the crank 28 in a clockwise direction to restress the spring 35.

FIGURE 4 shows a somewhat different embodiment of this invention. In this embodiment, the reel 17 of the winch 18 is directly mounted on the front end 19 of the platform 10. The tensioning mechanism takes the form of the hydraulic cylinder 55 mounted on the under side of the platform 10 at its rear end. The steel cable is at least partly replaced by a chain 56. Connected to the piston 57 of the hydraulic cylinder 55 is one end of a cable 58 that extends around a roller 59 attached to the rear end 16 of the platform 10 and carries at its other end a hook 60 for engaging a link of the chain 56. An end of the chain 56 may either be connected to a further cable which is wound onto the reel 17 or may alternatively be directly wound onto the reel 17.

In operation, the chain 56 (or the cable with the chain 56 at its end, respectively) is placed over the load 13 and the hook 60 is engaged into a link of the chain 56, so that the load 13 is reasonably tightly enveloped. The crank 28 is then operated to tension the cable means around the load 13 by the action of the hydraulic cylinder 55.

It is pointed out that similar features of this second embodiment may also be utilized in the first embodiment as described above, and vice versa. For instance, the helical compression spring 35 in the first embodiment may be replaced by a hydraulic cylinder similar to the cylinder 55 or by a pneumatic cylinder. Instead of using the fixing device 15, a chain and hook ararngement 56, 60 may be used with the first embodiment. Similarly, in the second embodiment, the fluid-operated cylinder 55 may be replaced by a compression spring similar to the spring 35. Also in both embodiments a tension or any other spring could be used.

Although it is possible to attach the crank 28 directly to a reel 17 and to arrange the stop lever 41 so as to engage the sprocket 30, the construction shown in FIGURES 2 and 3 is preferred for the following reasons. To insure proper fastening of the load 13, the reel 17 is arranged substantially in the middle of the front end 19 of the platform. The manual operation of the crank 28 and the lever 41, however, is much more convenient, if these elements are arranged at one corner of the platform 10, especially on the same side on which the driver's seat is located within the cab.

In the above description, the platform 10 has been described as forming part of a vehicle namely of a truck or the trailer of a truck. The term vehicle, however, is understood also to include any other kind of transportation means such as a railroad car or even the carriage of a hoist. Furthermore, the term cable means is understood to include steel cables as well as Manila or synthetic ropes, or any other suitable kind of binding material. Particularly, as stated above, a chain may be used as a part or whole of the cable means.

I claim:
1. A load binding arrangement for fastening a load on the loading platform of a vehicle, said arrangement comprising
   (a) cable means disposed to envelop said load, and means for connecting one end of said cable means to a first part of said platform;
   (b) a winch including an arm and a take-up reel for winding in the other end of said cable means, said reel being rotatably mounted on a first part of said arm, and means for pivotally mounting a second part of said arm on a second part of said platform; and
   (c) flexible means disposed between said arm and said platform for urging said first part of said arm in a direction to tension said cable means around said load.

2. An arrangement as in claim 1, wherein said winch further comprises a manually-operable crank, means inter-connecting said crank and said take-up reel, and stop means for preventing rotation of said take-up reel.

3. An arrangement as in claim 2, wherein said interconnecting means comprises a first sprocket connected to said take-up reel, a second sprocket connected to said crank and a chain encircling said first and second sprockets, and wherein said stop means comprises a lever for engaging one of said sprockets.

4. An arrangement as in claim 2, wherein said means for mounting said arm on said platform comprises a shaft, said arm and said crank being rotatably mounted on said shaft independently of each other.

5. An arrangement as in claim 1, wherein said flexible means comprises a spring.

6. A load binding arrangement for fastening a load on the loading platform of a vehicle, said arrangement comprising
   (a) cable means disposed to envelop said load, including means for connecting one end of said cable means to the rear end of said vehicle platform;
   (b) a winch including
      (i) an arm,
      (ii) a take-up reel rotatably mounted on one end of said arm, for winding in the other end of said cable means,
      (iii) a shaft pivotally mounting said arm at its other end on the front end of said vehicle platform close to a corner thereof,
      (iv) a manually operable crank rotatably mounted on said shaft and connected to rotate said reel, and stop means for preventing rotation of said reel; and
   (c) flexible means disposed between said arm and said platform for urging said one end of said arm in a downward direction.

References Cited

UNITED STATES PATENTS

| | | | |
|---|---|---|---|
| 2,539,997 | 1/1951 | Graves | 280—179.1 |
| 2,738,204 | 3/1956 | Ibey | 280—179.1 |
| 2,946,563 | 1/1960 | Eaton | 280—179.1 |

BENJAMIN HERSH, Primary Examiner

ROBERT R. SONG, Assistant Examiner